US012630269B2

(12) United States Patent
Kato et al.

(10) Patent No.: US 12,630,269 B2
(45) Date of Patent: May 19, 2026

(54) INFORMATION PROCESSING DEVICE, CONTROL METHOD, PROGRAM, AND STORAGE MEDIUM

(71) Applicants: PIONEER CORPORATION, Tokyo (JP); PIONEER SMART SENSING INNOVATIONS CORPORATION, Tokyo (JP)

(72) Inventors: Masahiro Kato, Kawagoe (JP); Takeshi Koda, Kawagoe (JP); Masahiro X Kato, Kawagoe (JP); Akira Gotoda, Kawagoe (JP); Kunio Shiratori, Tokyo (JP)

(73) Assignees: PIONEER CORPORATION, Tokyo (JP); PIONEER SMART SENSING INNOVATIONS CORPORATION, Tokyo (JP)

( * ) Notice: Subject to any disclaimer, the term of this patent is extended or adjusted under 35 U.S.C. 154(b) by 150 days.

(21) Appl. No.: 18/689,356

(22) PCT Filed: Sep. 10, 2021

(86) PCT No.: PCT/JP2021/033330
§ 371 (c)(1),
(2) Date: Mar. 5, 2024

(87) PCT Pub. No.: WO2023/037499
PCT Pub. Date: Mar. 16, 2023

(65) Prior Publication Data
US 2024/0400168 A1 Dec. 5, 2024

(51) Int. Cl.
*B63B 43/00* (2006.01)
*G01C 21/00* (2006.01)
(52) U.S. Cl.
CPC .......... *B63B 43/00* (2013.01); *G01C 21/3837* (2020.08); *G01C 21/3874* (2020.08)

(58) Field of Classification Search
None
See application file for complete search history.

(56) References Cited

U.S. PATENT DOCUMENTS

2014/0309841 A1 10/2014 Hara et al.
2020/0271454 A1 8/2020 Kato
(Continued)

FOREIGN PATENT DOCUMENTS

CN 206863970 U 1/2018
CN 107945579 A 4/2018
(Continued)

OTHER PUBLICATIONS

Silver, Andrew L., et al., "Risk Based Decisions for Entrance Channel Operation and Design", May 30, 1997, International Society of Offshore and Polar Engineers, pp. 815-822 (Year: 1997).*
(Continued)

*Primary Examiner* — Erin M Piateski
*Assistant Examiner* — Sarah A. Mueller
(74) *Attorney, Agent, or Firm* — Procopio, Cory, Hargreaves & Savitch LLP

(57) ABSTRACT

The controller 13 of the information processing device 1 is configured to acquire measurement data of a feature measured by a lidar 3 provided on a ship and measurement data of a water surface. In addition, the controllers 13 is configured to acquire information regarding a height of the feature from a river map DB 10. Then, the controller 13 is configured to acquire highest point information IH regarding a height of the highest point of the ship from a reference position of the ship. Then, the controller 13 is configured to calculate a ship highest point height based on the measurement data of the feature, the measurement data of the water surface, the information regarding the height of the feature, and the highest point information IH.

12 Claims, 10 Drawing Sheets

(56)        References Cited

U.S. PATENT DOCUMENTS

| | | | |
|---|---|---|---|
| 2021/0347449 A1 | 11/2021 | Dake et al. | |
| 2023/0236012 A1* | 7/2023 | Baji ........................ | G01S 17/50 |
| | | | 356/11 |

FOREIGN PATENT DOCUMENTS

| | | | | |
|---|---|---|---|---|
| CN | 108919299 A | 11/2018 | | |
| CN | 112027028 A | * 12/2020 | ............ | B63B 79/10 |
| CN | 113077660 A | 7/2021 | | |
| JP | 2000-142570 A | 5/2000 | | |
| JP | 2020-059403 A | 4/2020 | | |
| WO | 2013/076829 A1 | 5/2013 | | |
| WO | 2018/221453 A1 | 12/2018 | | |

OTHER PUBLICATIONS

Machine translation of Li et al. (CN-112027028-A) (Year: 2020).*
Machine translation of Miyazawa (JP-2000142570-A) (Year: 2000).*
Patent Cooperation Treaty, International Search Report, Application No. PCT/JP2021/033330, dated Nov. 16, 2021, in 4 pages.
European Patent Office, Extended European Search Report issued on the corresponding European Patent Application. No. 21956796.3 on Jul. 8, 2025, in 11 pages.

* cited by examiner

FIG. 6

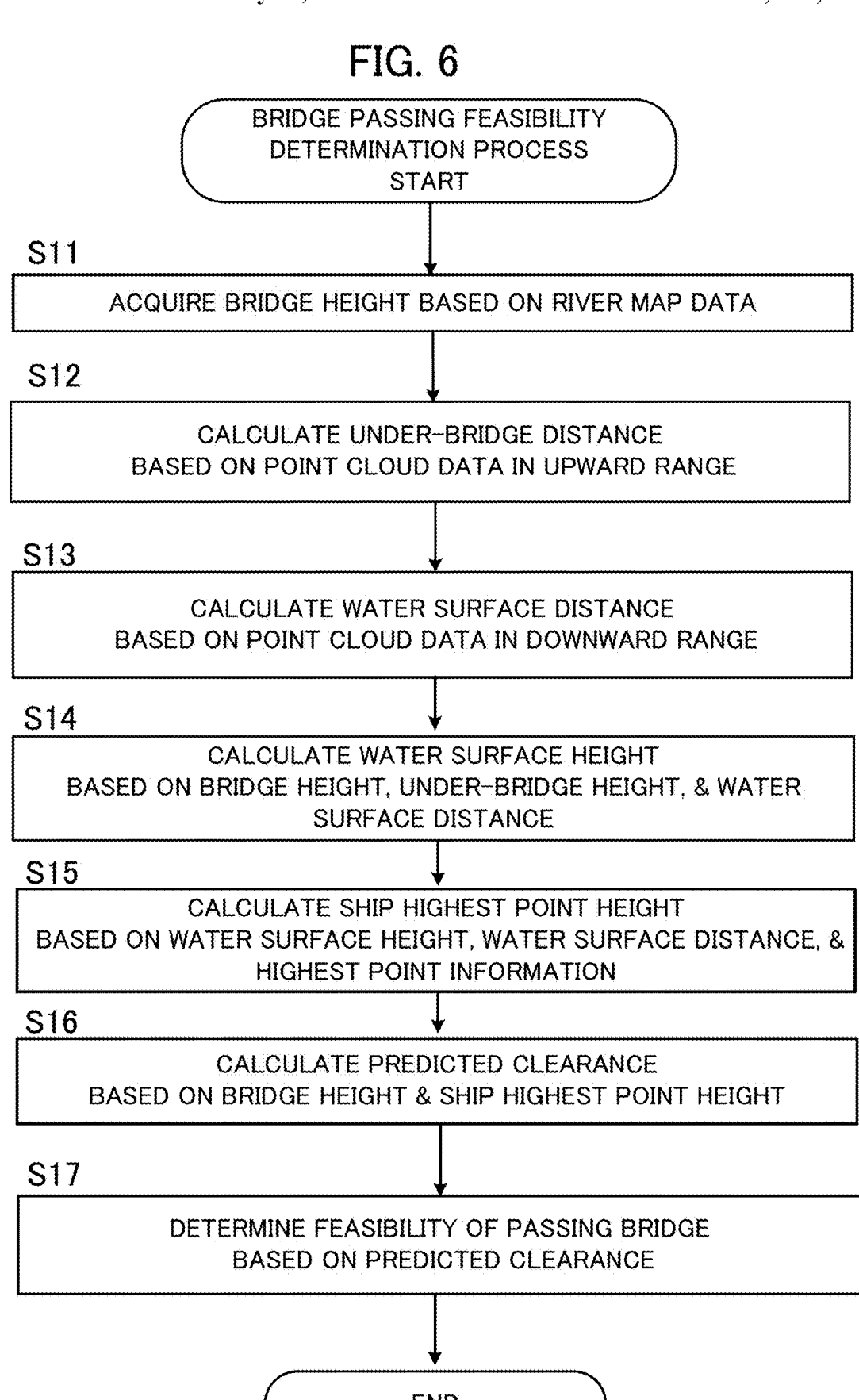

BRIDGE PASSING FEASIBILITY
DETERMINATION PROCESS
START

S11

ACQUIRE BRIDGE HEIGHT BASED ON RIVER MAP DATA

S12

CALCULATE UNDER-BRIDGE DISTANCE
BASED ON POINT CLOUD DATA IN UPWARD RANGE

S13

CALCULATE WATER SURFACE DISTANCE
BASED ON POINT CLOUD DATA IN DOWNWARD RANGE

S14

CALCULATE WATER SURFACE HEIGHT
BASED ON BRIDGE HEIGHT, UNDER-BRIDGE HEIGHT, & WATER
SURFACE DISTANCE

S15

CALCULATE SHIP HIGHEST POINT HEIGHT
BASED ON WATER SURFACE HEIGHT, WATER SURFACE DISTANCE, &
HIGHEST POINT INFORMATION

S16

CALCULATE PREDICTED CLEARANCE
BASED ON BRIDGE HEIGHT & SHIP HIGHEST POINT HEIGHT

S17

DETERMINE FEASIBILITY OF PASSING BRIDGE
BASED ON PREDICTED CLEARANCE

END

FIG. 10

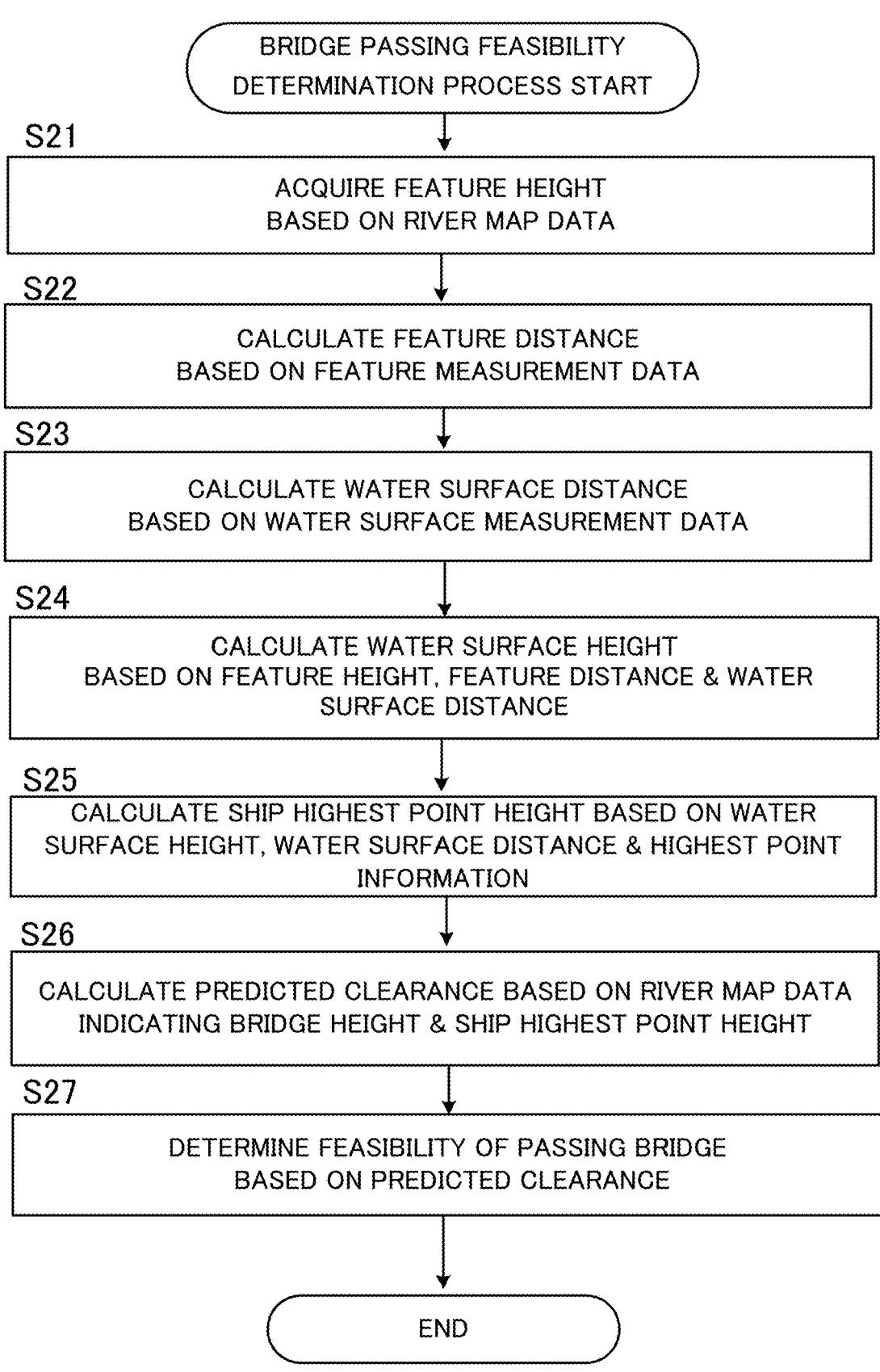

BRIDGE PASSING FEASIBILITY
DETERMINATION PROCESS START

S21
ACQUIRE FEATURE HEIGHT
BASED ON RIVER MAP DATA

S22
CALCULATE FEATURE DISTANCE
BASED ON FEATURE MEASUREMENT DATA

S23
CALCULATE WATER SURFACE DISTANCE
BASED ON WATER SURFACE MEASUREMENT DATA

S24
CALCULATE WATER SURFACE HEIGHT
BASED ON FEATURE HEIGHT, FEATURE DISTANCE & WATER
SURFACE DISTANCE

S25
CALCULATE SHIP HIGHEST POINT HEIGHT BASED ON WATER
SURFACE HEIGHT, WATER SURFACE DISTANCE & HIGHEST POINT
INFORMATION

S26
CALCULATE PREDICTED CLEARANCE BASED ON RIVER MAP DATA
INDICATING BRIDGE HEIGHT & SHIP HIGHEST POINT HEIGHT

S27
DETERMINE FEASIBILITY OF PASSING BRIDGE
BASED ON PREDICTED CLEARANCE

END

INFORMATION PROCESSING DEVICE, CONTROL METHOD, PROGRAM, AND STORAGE MEDIUM

CROSS-REFERENCE TO RELATED APPLICATIONS

This application is the US National Stage of International Patent Application PCT/JP2021/033330, filed Sep. 10, 2021, the contents of which are incorporated herein by reference.

TECHNICAL FIELD

The present disclosure relates to a determination as to whether or not a ship can pass under a bridge.

BACKGROUND

Conventionally, there is known a technique for estimating a self position of a moving body by matching (registration) between shape data of surrounding objects measured using a measuring device such as a laser scanner and map information in which the shapes of the surrounding objects are stored in advance. For example, Patent Literature 1 discloses an autonomous moving system configured to determine whether a detected object in voxels, which are obtained by dividing a space according to a predetermined pattern, is a stationary object or a moving object, and perform matching between measured data and the map data with respect to voxels determined to include a stationary object. Further, Patent Literature 2 discloses a scan matching method for performing self position estimation by matching between point cloud data outputted by a lidar and voxel data including a mean vector and a covariance matrix regarding a stationary object for each voxel. Furthermore, Patent Literature 3 discloses an autonomous shore reaching device configured to autonomously control a ship to get ashore, wherein the autonomous shore reaching device controls the posture of the ship so that a lidar can receive a light emitted by the lidar and reflected by an object in the vicinity of the shore to be reached.

PRIOR ART DOCUMENTS

Patent Literature

Patent Literature 1: WO2013/076829
Patent Literature 2: WO2018/221453
Patent Literature 3: JP2020-59403A

SUMMARY

Problem to be Solved by the Invention

When determining a route of a ship, it is common to select, based on tide level prediction information and the like, a route that a ship can safely pass under bridges. However, it is necessary to confirm whether or not a ship can actually pass under the bridge, taking into consideration cases where the water level becomes higher than the predicted tide level. If it is determined in advance that there is a risk to pass under the bridge, it will be possible to take measures such as turning around in a situation where the river width is wide and there are no other ships and changing routes. Thus, it is important for safe navigation to determine whether or not a ship can pass under the bridge in advance. It is necessary to accurately recognize the height of the highest point of the ship in determining whether or not a ship can pass under the bridge. When it comes to such a ship which does not have a self position estimation system, it is necessary to calculate the height of the highest point of the ship regardless of the self position estimation result. This also applies to ships that perform self position estimation only for plane coordinates, or ships that perform self position estimation in the height direction but with low estimation accuracy.

The present disclosure has been made in order to solve the above issue, and it is an object of the present invention to provide an information processing device capable of accurately calculating the height of the highest point of a ship even when an accurate self position estimation result in the height direction cannot be obtained.

Means for Solving the Problem

One invention is an information processing device including:
 a first acquisition unit configured to acquire
  feature measurement data which is measurement data of a feature measured by a measurement device provided in a ship and
  water surface measurement data which is measurement data of a water surface measured by the measurement device;
 a second acquisition unit configured to acquire information regarding a height of the feature from map data; and
 a ship highest point height calculation unit configured to calculate a ship highest point height which is a height of a highest point of the ship, based on
  the feature measurement data,
  the water measurement data,
  information regarding the height of the feature,
  highest point information regarding the height of the highest point of the ship from a reference position of the ship.
 Another invention is a control method executed by a computer, the control method including:
 acquiring
  feature measurement data which is measurement data of a feature measured by a measurement device provided in a ship and
  water surface measurement data which is measurement data of a water surface measured by the measurement device;
 acquiring information regarding a height of the feature from map data; and
 calculating a ship highest point height which is a height of a highest point of the ship, based on
  the feature measurement data,
  the water measurement data,
  information regarding the height of the feature,
  highest point information regarding the height of the highest point of the ship from a reference position of the ship.
 Still another invention is a program causing a computer to:
 acquire
  feature measurement data which is measurement data of a feature measured by a measurement device provided in a ship and
  water surface measurement data which is measurement data of a water surface measured by the measurement device;

acquire information regarding a height of the feature from map data; and calculate a ship highest point height which is a height of a highest point of the ship, based on the feature measurement data, the water measurement data, information regarding the height of the feature, highest point information regarding the height of the highest point of the ship from a reference position of the ship.

BRIEF DESCRIPTION OF THE DRAWINGS

FIG. 6 It is an example of a flowchart of the bridge passing feasibility determination process.

FIG. 10 It is an example of a flowchart showing a procedure of the bridge passing feasibility determination process according to the modification.

DETAILED DESCRIPTION OF PREFERRED EMBODIMENTS

Figure 1A:
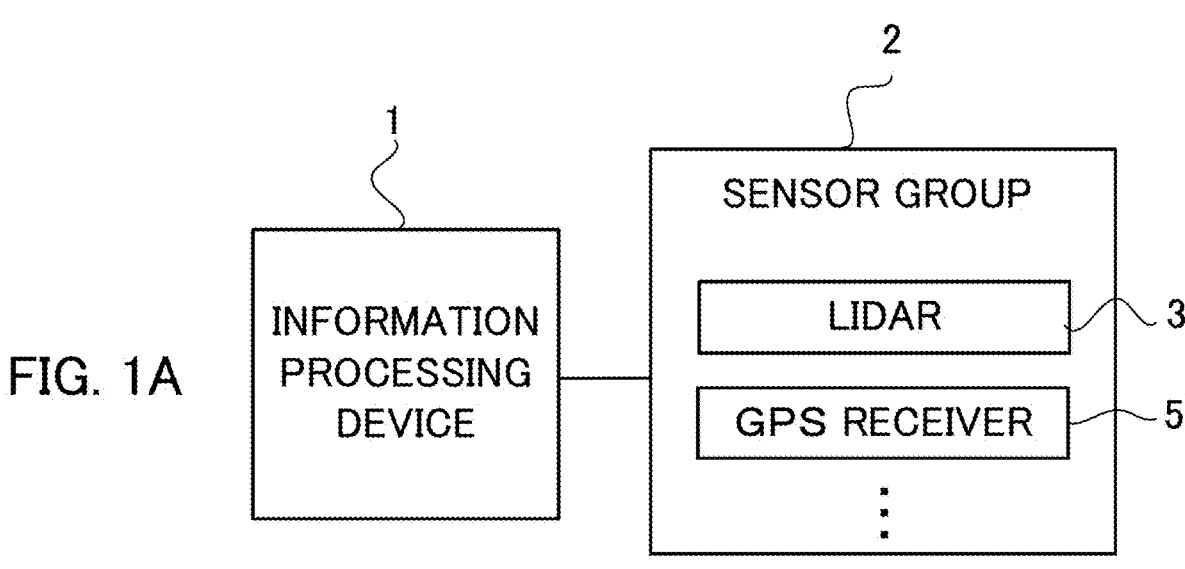
FIG. 1 It is a schematic diagram of an operation support system.

According to a preferred embodiment of the present invention, there is provided an information processing device including: a first acquisition unit configured to acquire feature measurement data which is measurement data of a feature measured by a measurement device provided in a ship and water surface measurement data which is measurement data of a water surface measured by the measurement device; a second acquisition unit configured to acquire information regarding a height of the feature from map data; and a ship highest point height calculation unit configured to calculate a ship highest point height which is a height of a highest point of the ship, based on the feature measurement data, the water measurement data, information regarding the height of the feature, highest point information regarding the height of the highest point of the ship from a reference position of the ship. According to this embodiment, the information processing device can accurately calculate the height of the highest point of the ship without using any self position estimation result.

In one aspect of the information processing device, the information processing device further includes: a feature distance calculation unit configured to calculate a feature distance, which is a distance in the height direction between the reference position and the feature, based on the feature measurement data; a water surface distance calculation unit configured to calculate a water surface distance, which is a distance in the height direction between the reference position and the water surface, based on the water surface measurement data; and a water surface height calculation unit configured to calculate a water surface height, which is a height of the water surface, based on the height of the feature, the feature distance, and the water surface distance, wherein the ship highest point height calculation unit is configured to calculate the ship highest point height, based on the water surface height, the water distance, and a height of the highest point of the ship from the reference position of the ship. According to this aspect, the information processing device can calculate the water surface height by using the water surface measurement data and the feature measurement data and accurately calculate the ship highest point height based on the calculated water surface height.

In another aspect of the information processing device, the information processing device further includes: a predicted clearance calculation unit configured to calculate a predicted clearance, which is a predicted clearance between the bridge and the ship, based on a bridge height which is a height of the bridge based on the map data and the ship highest point height, and a passing feasibility determination unit configured to determine, based on the predicted clearance, a feasibility of passage under the bridge by the ship.

In still another aspect of the information processing device, the information processing device further includes a threshold value determination unit configured to determine a threshold value to be compared with the predicted clearance in determining the feasibility of the passage, wherein the threshold value determination unit is configured to determine the threshold value based on an index representing variation in a water surface distance which is a distance in the height direction between the reference position and the water surface. According to this aspect, the information processing device sets the threshold value in consideration of the wave height, accurately determining the passage under the bridge by the ship. In some embodiments, the threshold value determination unit is configured to determine the threshold value based on a maximum value of plural standard deviations calculated during a predetermined period.

In still another aspect of the information processing device, the threshold value determination unit is configured to calculate a measured clearance between the bridge and the ship, based on measurement data obtained by measuring the bridge by a measurement device when the ship passes the bridge, calculate difference values between the measured clearance and the predicted clearance for plural bridges, and determine the threshold value based on an index representing variation in the calculated difference values and an index representing variation in the water surface distance. According to this aspect, it is possible to determine the threshold value to be compared with the predicted clearance by accurately considering the variation in the deviation of the predicted clearance from the measured clearance. In some embodiments, the threshold value determination unit is configured to increase the threshold value with an increase in the variation indicated by the index.

In still another aspect of the information processing device, the predicted clearance calculation unit is configured to calculate a measured clearance between the first bridge and the ship based on measurement data obtained by measuring the first bridge by the measuring device when the ship passes the first bridge, and generate correction information for correcting the predicted clearance of a second bridge other than the first bridge, based on the measured clearance and the predicted clearance of the first bridge. The above-described correction information is, in other words, correction information that allows the predicted clearance to be corrected universally (i.e., without limiting a specific bridge) regardless of bridges. With this aspect, the information processing device can obtain correction information for correcting the predicted clearance for each bridge to be used for the feasibility determination of passing under the bridge by the ship with high accuracy.

In still another aspect of the information processing device, the feature is the bridge, wherein the passing feasibility determination unit is configured to determine the feasibility of the passage, based on the predicted clearance and the height of the bridge acquired from the map data by the second acquisition unit. According to this aspect, when the bridge exists within the measurement range of the measurement device, based on the measurement data of the bridge and the map data including information regarding the height of the bridge, the information processing device can accurately determine the feasibility of passing under the bridge by the ship.

In still another aspect of the information processing device, the feature is a feature other than the bridge, wherein the second acquisition unit is configured to further acquire information regarding a height of the bridge from the map data, and wherein the passing feasibility determination unit is configured to determine the feasibility of the passage based on the predicted clearance and the height of the bridge acquired from the map data by the second acquisition unit. According to this aspect, the information processing device can accurately perform the feasibility determination of passing under the bridge by the ship by calculating the ship highest point height with reference to the feature whose information regarding the height is registered in the map data and by referring to the information regarding the height of the bridge from the map data.

According to another preferred embodiment of the present invention, there is provided a control method executed by a computer, the control method including: acquiring feature measurement data which is measurement data of a feature measured by a measurement device provided in a ship and water surface measurement data which is measurement data of a water surface measured by the measurement device; acquiring information regarding a height of the feature from map data; and calculating a ship highest point height which is a height of a highest point of the ship, based on the feature measurement data, the water measurement data, information regarding the height of the feature, highest point information regarding the height of the highest point of the ship from a reference position of the ship. By executing this control method, the computer can accurately calculate the height of the highest point of the ship without using any self position estimation result.

According to still another preferred embodiment of the present invention, there is provided a program causing a computer to: acquire feature measurement data which is measurement data of a feature measured by a measurement device provided in a ship and water surface measurement data which is measurement data of a water surface measured by the measurement device; acquire information regarding a height of the feature from map data; and calculate a ship highest point height which is a height of a highest point of the ship, based on the feature measurement data, the water measurement data, information regarding the height of the feature, highest point information regarding the height of the highest point of the ship from a reference position of the ship. In some embodiments, the program is stored in a storage medium.

Embodiments

Hereinafter, preferred embodiments of the present invention are described below with reference to drawings.

(1) Outline of Operation Support System

Figure 1B:
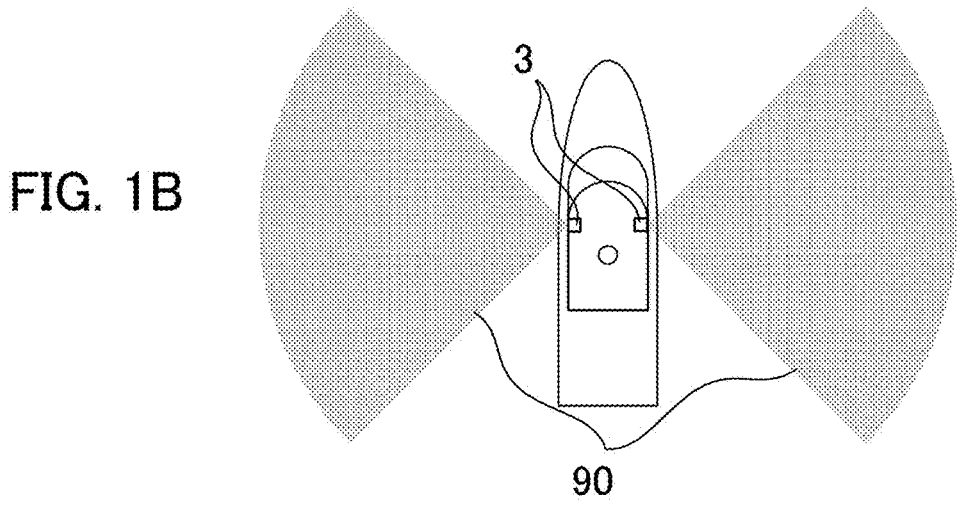
Figure 1C:
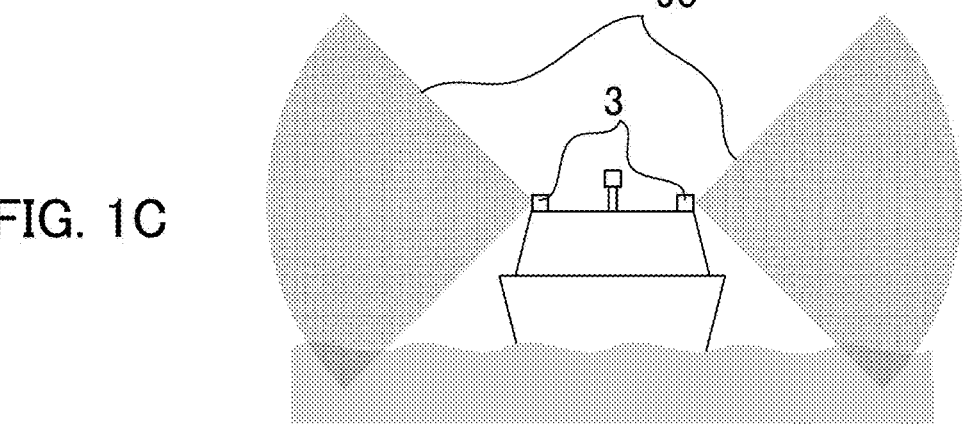

FIG. 1A to FIG. 1C are schematic configurations of an operation support system according to the present embodiment. Specifically, FIG. 1A shows a block configuration diagram of the operation support system, FIG. 1B is a top view illustrating a ship and the field-of-view range (distance measurable range) 90 of a lidar 3 to be described later included in the operation support system, FIG. 1C is a rear view of the ship and the field-of-view range 90 of the lidar 3. The operation support system includes an information processing device 1 which moves together with the ship that is a moving body, and a sensor group 2 mounted on the ship.

The information processing device 1 is electrically connected to the sensor group 2 and supports the operation of the ship provided with the information processing device 1 based on the outputs from various sensors included in the sensor group 2. In the present embodiment, as an example of the operation support, the information processing device 1 determines whether or not the ship can pass under a bridge which the ship is scheduled to pass, and executes the process according to the determination result. Examples of the operation support may include the support to get ashore such as autonomous docking. The information processing device 1 may be a navigation device provided on a ship or an electronic control device built in a ship. The information processing device 1 does not perform accurate self position estimation including position estimation in the height direction of the ship. In other words, the ship is not equipped with a self position estimation system that estimates an accurate position in the height direction. The information processing device 1 acquires the position, on the water surface, of the ship required from a GPS (Global Positioning Satellite) receiver 5 to be described later or the like, wherein the position on the water surface is required to refer to the river map database to be described later.

The sensor group 2 includes various external and internal sensors provided on the ship. For example, the sensor group 2 in the present embodiment include the lidar (Lidar: Light Detection and Ranging, or Laser Illuminated Detection And Ranging) 3 and the GPS receiver 5. The sensor group 2 may include a GNSS receiver that generates the positioning result other than the GPS receiver 5.

The lidar 3 is an external sensor configured to emit pulse lasers within a predetermined angle range in the horizontal direction (see FIG. 1B) and in the vertical direction (see FIG. 1C) and thereby discretely measures the distance to an object existing in the external space and generates three dimensional point cloud data indicative of the position of the object. In the example shown in FIG. 1B and FIG. 1C, as the lidar 3, there are provided in the ship a lidar directed to the left side direction of the ship and a lidar directed to the right side direction of the ship, respectively. The number of the lidars 3 installed in the ship is not limited to two and it may be one or may be three or more. In this case, the lidar 3 is equipped with a radiation unit for radiating a laser beam while changing the irradiation direction, a light receiving unit for receiving the reflected light (scattered light) of the radiated laser beam, and an output unit for outputting data based on the received light signal outputted by the light receiving unit. Each data measured for each irradiation direction of the pulsed laser is generated based on the irradiation direction corresponding to the laser beam received by the light receiving unit and the response delay time of the laser beam which is identified by the received light signal described above. It is noted that the lidar 3 is not limited to the above-described scan type lidar and may be a flash type lidar for generating three-dimensional data by diffusing and radiating laser beams into the field-of-view of a two-dimensional array sensor. The lidar 3 is an example of the "measurement device" in the present invention.

Further, in the present embodiment, the measurement range of the lidar 3 in the vertical direction at least includes the range (i.e., a range of direction in which the angle of elevation is positive) upper than the horizontal direction, and the range (i.e., the direction in which the angle of depression is positive) lower than the horizontal direction. Thus, the measurement range of the lidar 3 includes both a target bridge of passage by the ship and the water surface where the ship floats. In the case where there are plural lidars 3, the measurement range of at least one of the plural lidars 3 includes the range upper than the horizontal direction and the measurement range of at least one of the plural lidars 3 includes the range lower than the horizontal direction.

(2) Configuration of Information Processing Device

Figure 2:
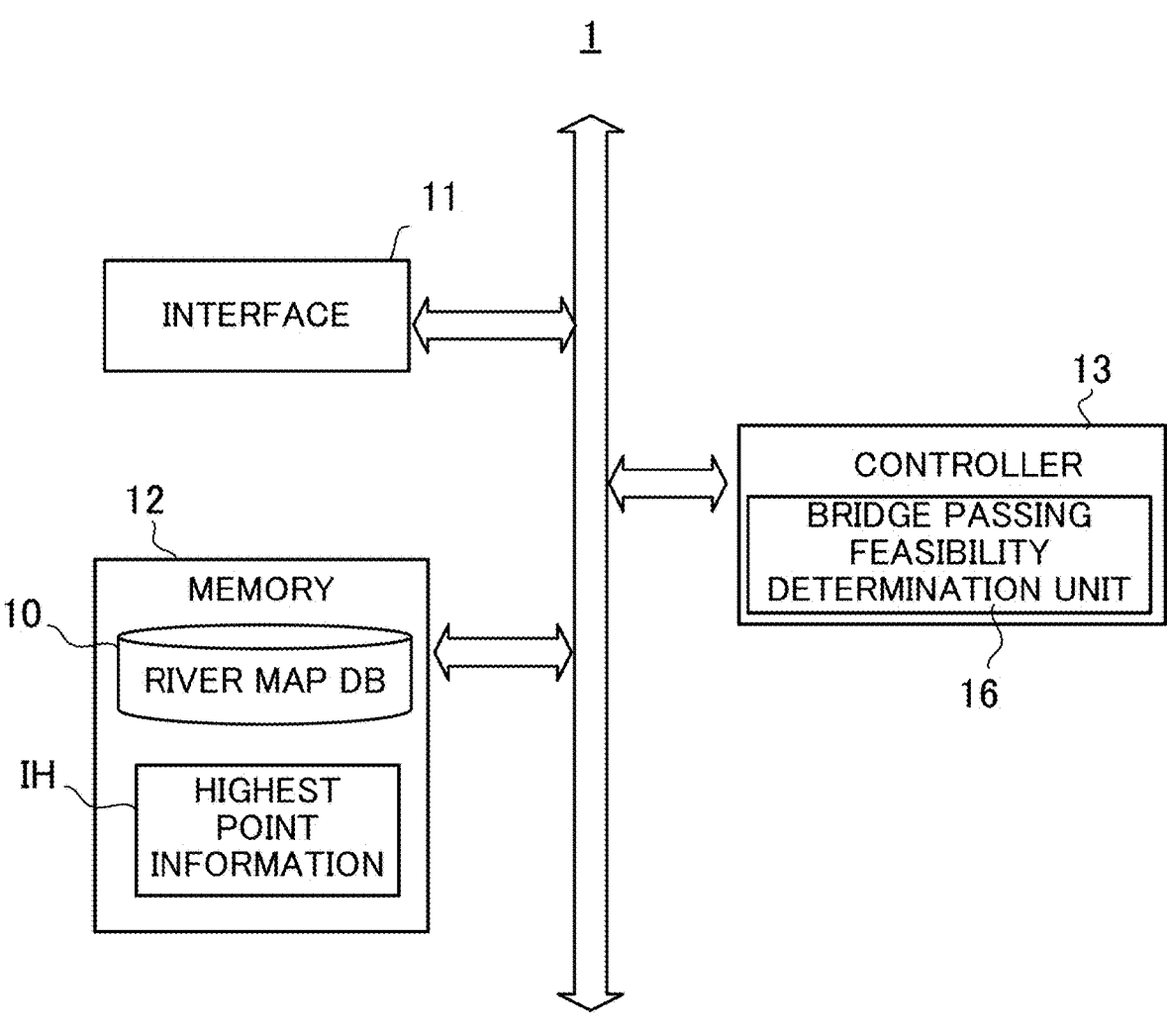
FIG. 2 It is a block diagram showing a functional configuration of an information processing device.

FIG. 2 is a block diagram illustrating an example of a hardware configuration of the information processing device 1. The information processing device 1 mainly includes an interface 11, a memory 12, and a controller 13. Each of these elements is connected to each other through a bus line.

The interface 11 performs the interface operation related to the transfer of data between the information processing device 1 and an external device. In the present embodiment, the interface 11 acquires and supplies output data from each sensor of the sensor group 2 such as the lidar 3 and the GNSS receiver 5 to the controllers 13. For example, the interface 11 also supplies signals relating to the control of the target ship generated by the controller 13 to each component of the ship to control the operation of the target ship. For example, the ship includes a driving source such as an engine or an electric motor, a screw for generating a propulsive force in the traveling direction based on the driving force from the driving source, a thruster for generating a lateral propulsive force based on the driving force from the driving source, and a rudder which is a mechanism for controlling the traveling direction of the ship. Then, during an autonomous driving operation such as autonomous docking, the interface 11 supplies a control signal generated by the controller 13 to each of these components. In the case where an electronic control device is provided in the ship, the interface 11 supplies a control signal generated by the controller 13 to the electronic control device. Examples of the interface 11 include a wireless interface, such as a network adapter, for performing wireless communication, and a hardware interface, such as a cable, for connecting to an external device. The interface 11 may also perform interface operations with various peripheral devices such as an input device, a display device, and a sound output device.

The memory 12 is configured by various volatile and non-volatile memories such as a RAM (Random Access Memory), a ROM (Read Only Memory), a hard disk drive, and a flash memory. The memory 12 stores a program for the controller 13 to perform a predetermined process. The program executed by the controller 13 may be stored in a storage medium other than the memory 12.

The memory 12 also stores the river map database (DB: Database) 10 and the highest point information IH.

The river map DB 10 stores data (also referred to as "feature data") relating to features (landmarks) present on or near rivers (waterways). Examples of the features described above at least include bridges which are provided in waterways and which ships can pass. The feature data includes position information indicating the position where the feature is provided, and attribute information indicating various attributes of the feature such as the size of the feature. The attribute information of the feature data corresponding to a bridge includes at least information regarding the height (e.g., altitude) of the girder bottom of the bridge (in other words, the height of the bottom surface of the bridge over the river).

In some embodiments, the river map DB 10 may further include information other than feature data, such as information on the docking location (including the shore and pier), information on waterways where the ship can move, and the like. The river map DB 10 may be stored in an external storage device of the information processing device 1 such as a hard disk connected to the information processing device 1 through the interface 11. The storage device may be a server device that communicates with the information processing device 1. Further, the storage device may be configured by a plurality of devices. The river map DB 10 may also be updated periodically. In this case, for example, from the server device that manages the map information, the controller 13 receives partial map information regarding the area to which the self position belongs via the interface 11, and reflects it in the river map DB 10.

The highest point information IH is information regarding the height of the highest portion (highest point) of the ship in the ship coordinate system, which is a coordinate system with respect to the ship. For example, the highest point information IH represents the height (i.e., distance in the height direction) of the highest point of the ship from a reference position (also referred to as "ship reference position") of the ship. In other words, the ship reference position is identical to the origin in the coordinate system to be adopted in the point cloud data outputted by the lidar 3 and corresponds to the installation position of the lidar 3, for example. The highest point information IH is generated based on the measurement result acquired beforehand, and is stored in advance in the memory 12.

In addition to the river map DB 10, the memory 12 stores information required for processing performed by the information processing device 1 in the present embodiment. For example, the memory 12 stores information to be used for setting the down-sampling size when down-sampling is applied to the point cloud data obtained in one cycle period of scanning by the lidar 3. In another example, the memory 12 stores operation route information regarding the operation route that the ship is supposed to pass.

The controller 13 includes one or more processors, such as a CPU (Central Processing Unit), a GPU (Graphics Processing Unit), and a TPU (Tensor Processing Unit), and controls the entire information processing unit 1. In this case, the controller 13 performs processing related to the operation support or the like by executing a program stored in the memory 12 or the like.

Further, the controller 13 functionally includes a bridge passing feasibility determination unit 16. Based on the feature data relating to bridges, the highest point information IH, and the point cloud data outputted by the lidar 3, the bridge passing feasibility determination unit 16 determines whether or not the ship can pass under each bridge on the operation route of the ship. Then, the controller 13 functions as the "first acquisition unit", the "second acquisition unit", the "feature distance calculation unit", the "water surface distance calculation unit", the "water surface height calculation unit", the "ship highest point height calculation unit", "the predicted clearance calculation unit", the "passing feasibility determination unit", the "threshold value determination unit", and a computer configured to execute the program.

(3) Bridge Passing Feasibility Determination Process

Next, a description will be given of the process (also referred to as "bridge passing feasibility determination process") relating to the feasibility determination of passing under the bridge to be made by the bridge passing feasibility determination unit 16 will be described. In summary, the bridge passing feasibility determination unit 16 calculates the height (also referred to as "ship highest point height") of the highest point of the ship, based on: information regarding the height (also referred to as "bridge height") of the bridge according to the river map DB 10; the point cloud data obtained by measuring the bridge and the water surface by the lidar 3; and the highest point information IH. Then, based on the bridge height and the ship highest point height, the bridge passing feasibility determination unit 16 predicts the clearance (also referred to as "predicted clearance") in the height direction between the bridge and the ship under the bridge, and determines whether or not the ship can pass under the bridge based on the predicted clearance. Thus, the bridge passing feasibility determination unit 16 re-confirms, in advance, whether or not the ship can pass under the bridge safely even when the ship is not provided with a self position estimation system for estimating a high-precision position in the height direction.

It is noted that the bridge height shall represent the height of the bottom of the bridge over the river (i.e., the height of the bottom of the girder). In addition, "height" adopted in the calculation of the ship highest point height and the bridge height represents the height (e.g., altitude) in the coordinate system adopted in the river map DB 10.

Figure 3:
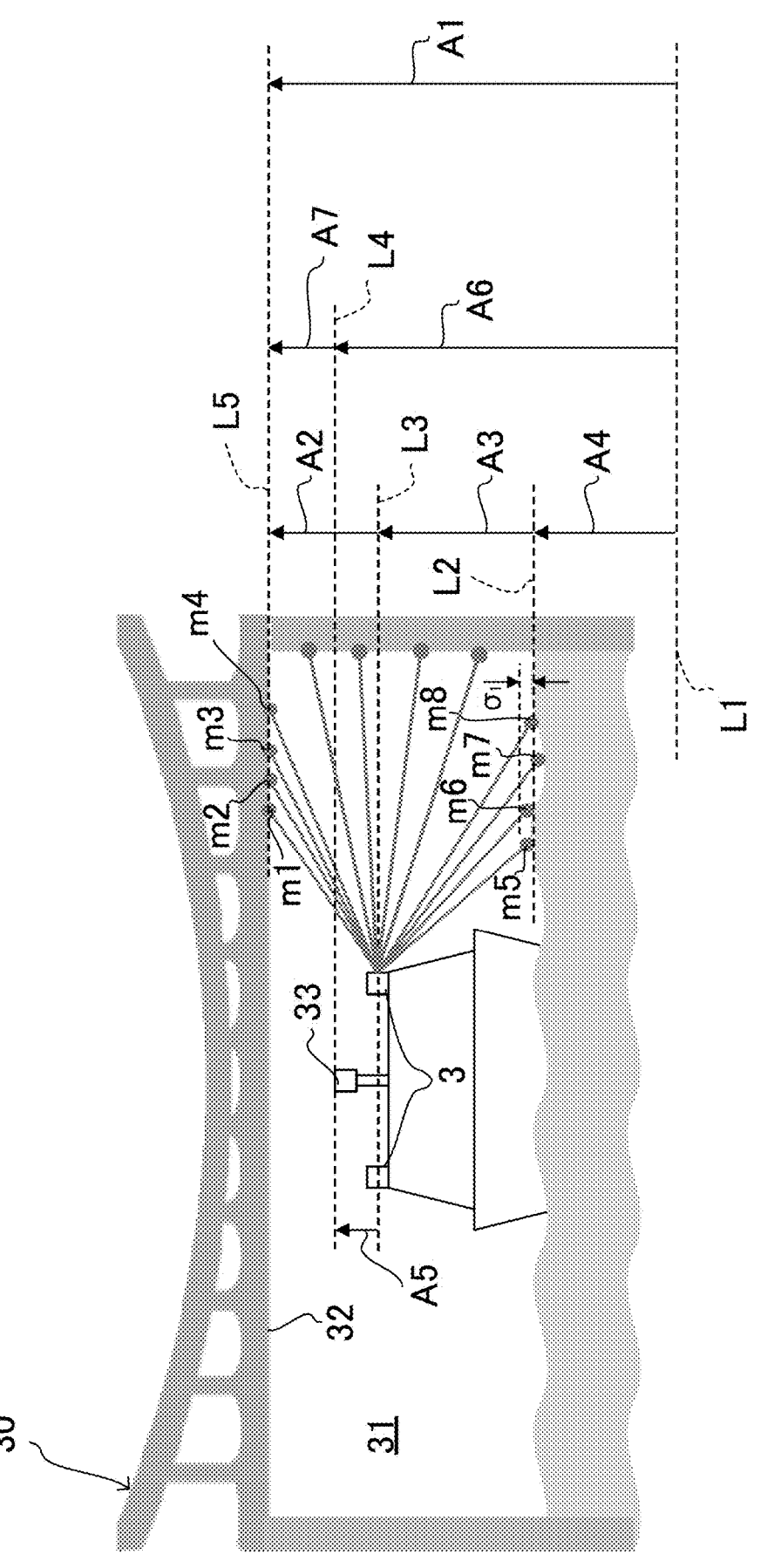
FIG. 3 It is a diagram showing an outline of the bridge passing feasibility determination process.

FIG. 3 is a diagram showing an outline of a bridge passing feasibility determination process. FIG. 3 illustrates a rear view of a ship passing through the bridge 30. In the example shown in FIG. 3, the ship is provided with two lidars 3, and any position to be the same height as the lidar 3 is determined to be the ship reference position. Further, in the ship, there is a projection portion 33 which is the highest point of the ship. Further, the bridge 30 is equipped with a girder bottom portion 32 which constitutes the bottom surface of the structural part above the river, and forms an under-girder space 31 which the ship can pass through. In addition, the line L1 indicates the origin of the height (bridge height and ship highest point height), the line L2 indicates the water surface position, and the line L3 indicates the position to be the same height as the ship reference position. Further, the line L4 indicates the position at which the height is the same as the highest point of the ship, and the line L5 indicates the position at which the height is the same as the girder bottom portion 32 forming the bottom surface of the bridge 30 on the river. Furthermore, the measured points "m1" to "m8" indicate the positions measured by the lidar 3.

The bridge passing feasibility determination unit 16 calculates a predicted clearance to be used for the bridge passing feasibility determination when it is determined that a ship has approached the bridge 30. In this instance, as described below, the bridge passing feasibility determination unit 16 specifies each height or width corresponding to the arrows A1 to A7 in the order from the arrow A1 to the arrow A7 to thereby calculate the predicted clearance to be used for the bridge passing feasibility determination.

First, the bridge passing feasibility determination unit 16 extracts the feature data corresponding to the bridge 30 under which the ship is going to pass from the river map DB 10, and identifies the bridge height of the bridge 30 (see arrow A1) by referring to the extracted feature data. In this instance, for example, based on the present position of the ship and the operation route, the bridge passing feasibility determination unit 16 specifies the subsequent bridge 30, under which the ship will pass, selected from bridges registered in the river map DB 10, and identifies the bridge height of the bridge 30.

Further, the bridge passing feasibility determination unit 16 calculates the distance (the distance corresponding to an arrow A2 and also referred to as "under-bridge distance") between the ship reference position and the girder bottom portion 32 which is the bottom surface of the bridge 30 based on the point cloud data (also referred to as "bridge measurement data") obtained by measuring the bridge 30 by the lidar 3. In this case, upon determining that the distance between the ship and the bridge 30 is within the maximum distance of measurement by the lidar 3, the bridge passing feasibility determination unit 16 extracts, as the bridge measurement data, point cloud data existing above the horizontal plane (i.e., existing in the direction in which the angle of elevation is positive) from the point cloud data outputted by the lidar 3. In some embodiments, in order to obtain the bridge measurement data which does not include any detected points, such as bridge piers, other than the bridge, the bridge passing feasibility determination unit 16 may calculate the maximum value of the z-coordinate values of the point cloud data and then extract measured points whose z-coordinate values are close to the calculated maximum value. In FIG. 3, the bridge passing feasibility determination unit 16 determines that data corresponding to the measured points "m1" to "m4" of the girder bottom portion 32 is the bridge measurement data and extracts the data from the point cloud data generated by the lidar 3. Then, the bridge passing feasibility determination unit 16 calculates, as the under-bridge distance, a representative value, such as the average value and the lowest value, of the coordinate values in the height direction of the extracted bridge measurement data.

Further, based on the point cloud data (also referred to as "water surface measurement data") of the water surface measured by the lidar 3, the bridge passing feasibility determination unit 16 calculates the distance (i.e., distance corresponding to the arrow A3, also referred to as "water surface distance") in the height direction between the ship reference position and the water surface. In this case, the bridge passing feasibility determination unit 16 extracts, from the point cloud data outputted by the lidar 3, the water surface measurement data that is point cloud data existing below the horizontal plane (i.e. the direction in which the angle of depression is positive). In some embodiments, in order to exclude any detected points, such as a bridge pier, a quay, and another ship, other than the water surface from the water surface measurement data, the bridge passing feasibility determination unit 16 may calculate the minimum value of the z-coordinate values of the point cloud data and then extract measured points whose z-coordinate values are close to the calculated minimum value to obtain the water surface measurement data. In FIG. 3, the bridge passing feasibility determination unit 16 determines that data corresponding to the measured points "m5" to "m8" of the water surface is water surface measurement data and extracts the data from the point cloud data generated by the lidar 3. Then, the bridge passing feasibility determination unit 16 calculates the water surface distance that is a representative value, such as the average value and the lowest value, of the coordinate values in the height direction of the extracted water surface measurement data. In some embodiments, the bridge passing feasibility determination unit 16 may calculate the water surface distance by plural times and then calculate the average value of the calculation results of the water surface distance obtained by the plural times calculations as the water surface distance used in the subsequent processing. Although only the measured points "m1" to "m8" generated by the lidar 3 provided on one side (right side) in FIG. 3 are shown, point cloud data generated by the lidars 3 provided on both sides (right side and left side) is used in practice.

Next, the bridge passing feasibility determination unit 16 calculates the water surface height (see arrow A4) which is the height of the water surface by subtracting the under-bridge distance (see arrow A2) and the water surface distance (see the arrow A3) from the bridge height (seethe arrow A1). It should be noted that the water surface height indicates the height expressed by the same scale (for example, altitude) as the bridge height (and the ship highest point height described later).

Next, the bridge passing feasibility determination unit 16 specifies the height-wise width (see the arrow A5) between the ship reference position and the highest point, by referring to the highest point information IH from the memory 12. Then, the bridge passing feasibility determination unit 16 calculates the highest point height (see arrow A6) of the ship that is identical to the height obtained by adding the water surface distance (see arrow A3) and the width (see arrow A5) between the ship reference position and the highest point to the water surface height (see arrow A4).

Then, the bridge passing feasibility determination unit 16 calculates, as the predicted clearance (see the arrow A7), the width obtained by subtracting the ship highest point height from the bridge height.

Thereafter, upon determining that the calculated predicted clearance is equal to or larger than a threshold value (also referred to as "predicted clearance threshold value Th"), the bridge passing feasibility determination unit 16 determines that it is feasible for the ship to pass under the bridge. In contrast, if the predicted clearance is less than the predicted clearance threshold value Th, the bridge passing feasibility determination unit 16 determines that there is a possibility that the ship cannot safely pass under the bridge.

Thus, even when not performing highly accurate self position estimation such as position estimation based on NDT scan matching, the bridge passing feasibility determination unit 16 can accurately make the passing feasibility determination as to the bridge that the ship is planned to pass, based on the point cloud data outputted by the lidar 3 and the map data relating to the bridge.

Next, a description will be given of the method of determining the predicted clearance threshold value Th. Here, as an exemplary method, a method of determining a predicted clearance threshold value Th based on an index representing variation in the calculated water surface distance (see the arrow A3) will be described. The predicted clearance threshold value Th may be set to a fixed value previously stored in the memory 12 or the like, instead of being determined based on the method described below.

The bridge passing feasibility determination unit 16 calculates the standard deviation "$\sigma_1$" of plural calculated values of the water surface distance calculated during a most-recent predetermined period. For example, provided that the water surface distance is calculated in cycles of 100 [ms] and that the predetermined period is set to 5 [s], the standard deviation at is calculated from 50 calculated values of the water surface distance. The standard deviation at is an example of the "index representing variation in the water surface distance". The bridge passage feasibility determination unit 16 calculates the standard deviation $\sigma_1$ at predetermined time intervals, and calculates, as the predicted clearance threshold value Th, a value obtained by multiplying the maximum value "$\sigma_1$ (max)" selected from the calculated plural standard deviations $\sigma_1$ by a predetermined coefficient "k". Namely, the bridge passing feasibility determination unit 16 calculates the predicted clearance threshold value Th based on the following equation (1).

$$Th = k \cdot \sigma_1 (\text{max}) \tag{1}$$

In this case, for example, the coefficient k is set to a fixed value to be within a sufficient confidence interval (e.g., k=5).

Figure 4A:
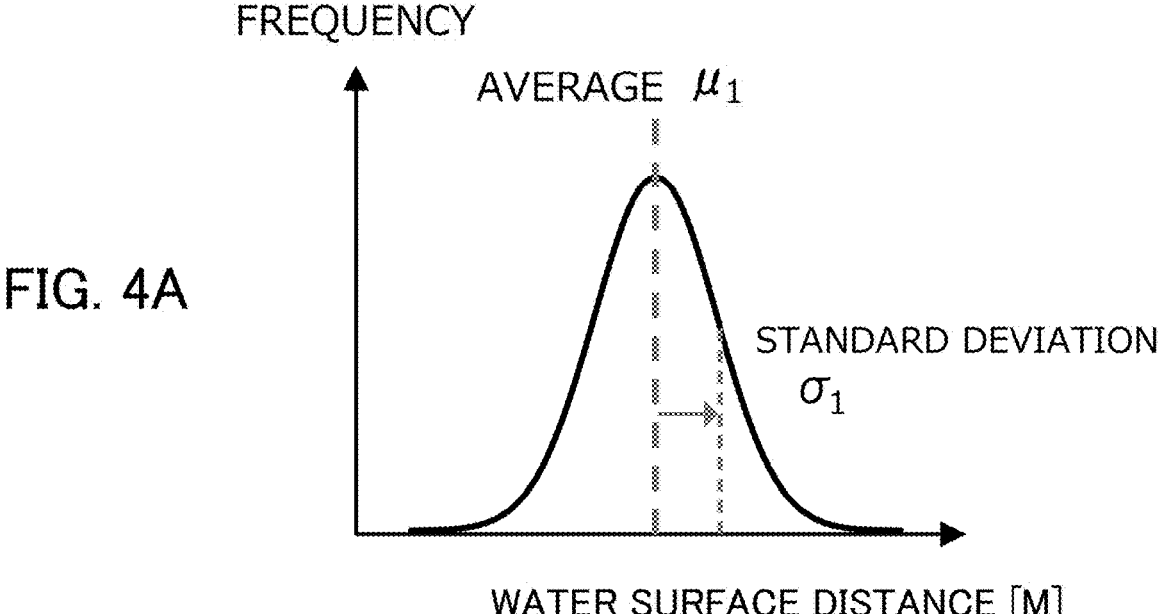
FIG. 4A indicates a frequency distribution of the water surface distance.
Figure 4B:
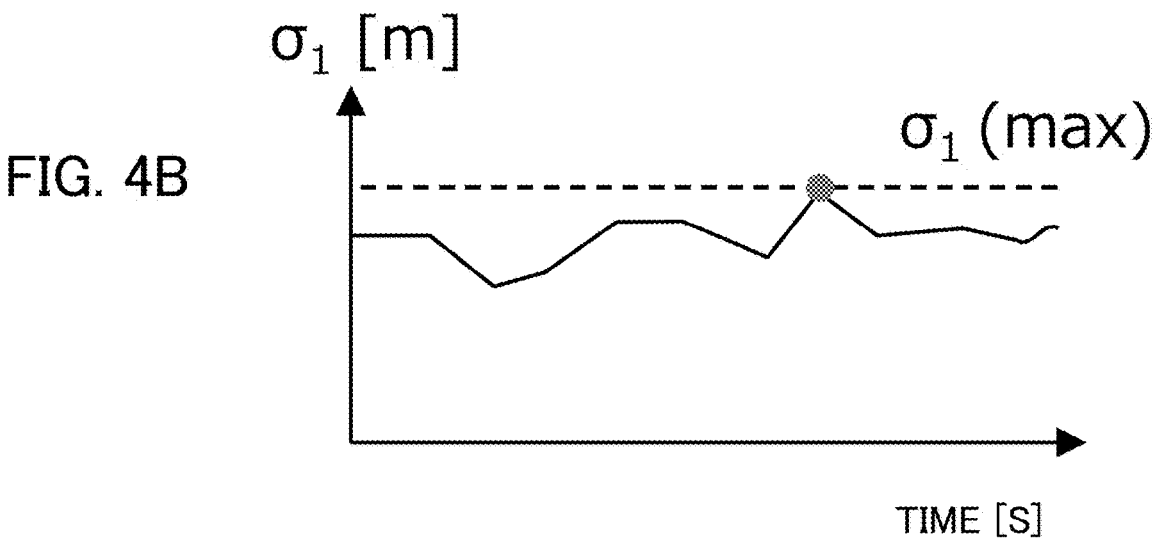
FIG. 4B indicates an example of a graph of the time transition of the standard deviation of the water surface distance.

FIG. 4A shows the frequency distribution of the water surface distance when the water surface distance used for the calculation of the standard deviation $\sigma_1$ (for details, the value in the height direction of each water surface measurement data) is regarded as a discrete value. Further, FIG. 4B shows an exemplary graph of the time transition of the standard deviation $\sigma_1$ calculated at predetermined time intervals. In FIG. 4A, "$\mu_1$" represents the average value of the surface distance. The bridge passing feasibility determination unit 16 calculates the standard deviation $\sigma_1$ by aggregating the values in the height direction of each water surface measurement data and then monitors the standard deviations $\sigma_1$ calculated at predetermined time intervals for a predetermined time as shown in FIG. 4B to thereby identify the maximum value $\sigma_1$ (max).

Here, the effect of determining the predicted clearance threshold value Th based on the calculated water surface distance will be supplemented. The variation in the water surface distance obtained as a result of measurement of the water surface by the lidar 3 is affected not only by the error in the point cloud data outputted by the lidar 3 and the ship's sway but also by the wave with a big height. When the wave height is large, the vertical motion in the height direction of the ship also increases, and the variation in the water surface measurement data also increases. Taking the above into consideration, the bridge passing feasibility determination unit 16 increases the predicted clearance threshold value Th with an increase in the standard deviation Qi, based on the equation (1). This makes it possible to make an accurate and safe determination as to the feasibility of passing the bridge.

Figure 5:
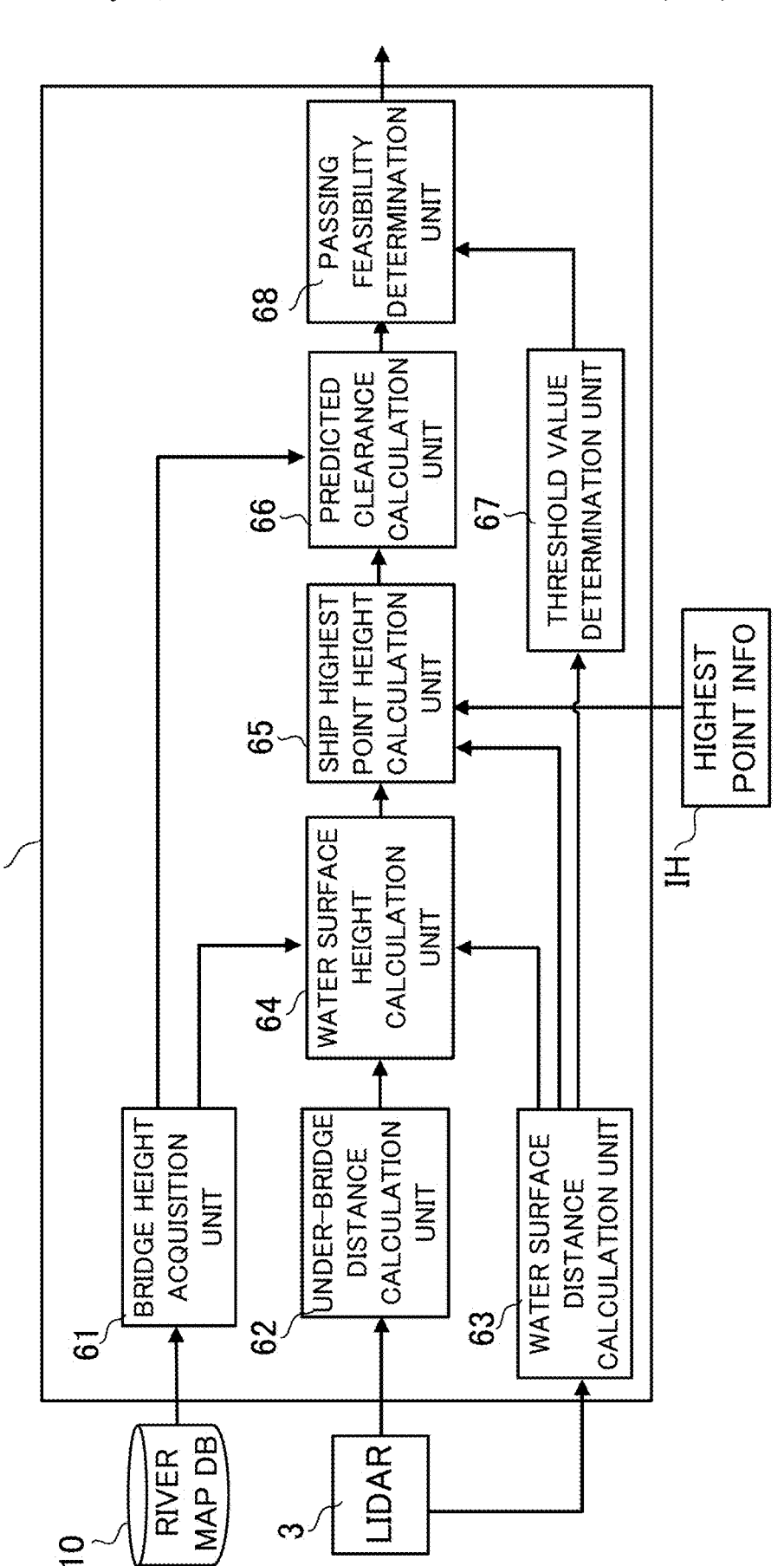
FIG. 5 It is an example of a functional block of the bridge passing feasibility determination unit.

FIG. 5 is an example of a functional block of the bridge passing feasibility determination unit 16. The bridge passing feasibility determination unit 16 functionally includes a bridge height acquisition unit 61, an under-bridge distance calculation unit 62, a water surface distance calculation unit 63, a water surface height calculation unit 64, a ship highest point height calculation unit 65, a predicted clearance calculation unit 66, a threshold value determination unit 67, and a passing feasibility determination unit 68.

The bridge height acquisition unit 61 extracts the feature data corresponding to the target bridge of passage from the river map DB 10, and acquires the bridge height based on the extracted feature data. The under-bridge distance calculation unit 62 calculates the under-bridge distance based on the bridge measurement data obtained by measuring the bridge (i.e., measurement upper than the horizontal direction). The water surface distance calculation unit 63 calculates the water surface distance based on water surface measurement data obtained by measuring the water surface (i.e., measurement lower than the horizontal direction).

The water surface height calculation unit 64 calculates the water surface height based on: the bridge height acquired by the bridge height acquisition unit 61; the under-bridge distance computed by the under-bridge distance calculation unit 62; and the water surface distance computed by the water surface distance calculation unit 63. Then, the ship highest point height calculation unit 65 calculates the ship highest point height based on: the water surface distance calculated by the water surface distance calculation unit 63; the water surface height calculated by the water surface height calculation unit 64; and the height-wise width between the ship reference position and the highest point indicated by the highest point information IH.

The predicted clearance calculation unit 66 calculates the predicted clearance based on the bridge height calculated by the bridge height acquisition unit 61 and the ship highest point height calculated by the ship highest point height calculation unit 65. The threshold value determination unit 67 calculates the standard deviation at and the maximum value $\sigma_1$ (max) based on the water surface measurement data acquired by the water surface distance calculation unit 63, and determines the predicted clearance threshold value Th by referring to the equation (1).

The passing feasibility determination unit 68 determines the feasibility of the passage of the bridge based on the predicted clearance calculated by the predicted clearance calculation unit 66 and the predicted clearance threshold value Th determined by the threshold value determination unit 67. Then, passing feasibility determination unit 68 supplies the determination result as to the feasibility of the passage to other processing blocks or the like of the controller 13. Thereafter, in some embodiments, through the interface 11, the controller 13 may control the display and/or the audio output based on the determination result as to the feasibility of the passage of the bridge. For example, if the predicted clearance is less than the predicted clearance threshold value, the controller 13 outputs a warning to the effect that the ship may not be able to safely pass under the bridge. In another example, the controller 13 searches for another route that does not pass under the bridge determined to be not safe to pass under, and controls output of guidance information on the searched route and/or controls the operation of the ship.

FIG. 6 is an example of a flowchart of a bridge passing feasibility determination process executed by the bridge passing feasibility determination unit 16. For example, after starting the operation of the ship based on the operation route, the bridge passing feasibility determination unit 16 executes the processing of the flowchart for each of the bridges on the operation route in sequence.

First, the bridge passing feasibility determination unit 16 extracts the feature data corresponding to a target bridge of the bridge passing feasibility determination process from the river map DB 10, and acquires the bridge height of the bridge based on the extracted feature data (step S11).

Next, if the target bridge exists within the measurement range of the lidar 3, the bridge passing feasibility determination unit 16 calculates the under-bridge distance based on the bridge measurement data which is point cloud data obtained by measuring the upward range by the lidar 3 (step S12). Upon determining that the ship has approached the target bridge within a predetermined distance (in other words, the bridge is within the measurement range of the lidar 3), the bridge passing feasibility determination unit 16 executes the process at step S12. Further, the bridge passing feasibility determination unit 16 calculates the water surface distance based on the water surface measurement data which is point cloud data obtained by measuring the downward range by the lidar 3 (step S13).

The process at step S11, the process at step S12, and the process at step S13 may be performed in any order. Further, the bridge passing feasibility determination unit 16 may perform the process at step S13 at any timing regardless of the distance between the ship and the target bridge. In some embodiments, the bridge passing feasibility determination unit 16 may use, as the value of the water surface distance in the subsequent processes, an average value or any other representative value of the calculated plural results of the water surface distance obtained by performing the process at step S13 by plural times.

Next, the bridge passing feasibility determination unit 16 calculates the water surface height based on the bridge height acquired at step S11, the under-bridge distance calculated at step S12 and the water surface distance calculated at step S13 (step S14). Then, the bridge passing feasibility determination unit 16 calculates the ship highest point height based on the water surface height calculated at step S14, the water surface distance calculated at step S13, and the highest point information IH (step S15). Then, the bridge passing feasibility determination unit 16 calculates the predicted clearance based on the bridge height acquired at step S11 and the ship highest point height calculated at step S15 (step S16). Then, the bridge passing feasibility determination unit 16 determines the feasibility of the passage of the target bridge by the ship based on the predicted clearance calculated at step S16 (step S17). In this instance, in some embodiments, the bridge passing feasibility determination unit 16 sets, as described above, the predicted clearance threshold value Th which is a threshold value for determination used to compare with the predicted clearance, on the basis of the standard deviation al which is an index representing the variation in the water surface distance calculated at step S13.

(4) Modifications

Hereinafter, a description will be given of preferred modifications to the above-described embodiment. The following modifications may be applied to the embodiment in combination.

First Modification

The bridge passing feasibility determination unit 16 may use a value that changes adaptively instead of using a fixed value as the coefficient k used for calculation of the predicted clearance threshold value Th. Specifically, the bridge passing feasibility determination unit 16 measures the actual value (also referred to as "measured clearance") of the distance in the height direction between the bridge and the ship under the bridge and sets the coefficient k based on the degree of variation in the difference between the measured clearance and the predicted clearance. Thus, the bridge passing feasibility determination unit 16 sets the predicted clearance threshold value Th to a suitable value that is not too large and ensures adequate security.

Figure 7:
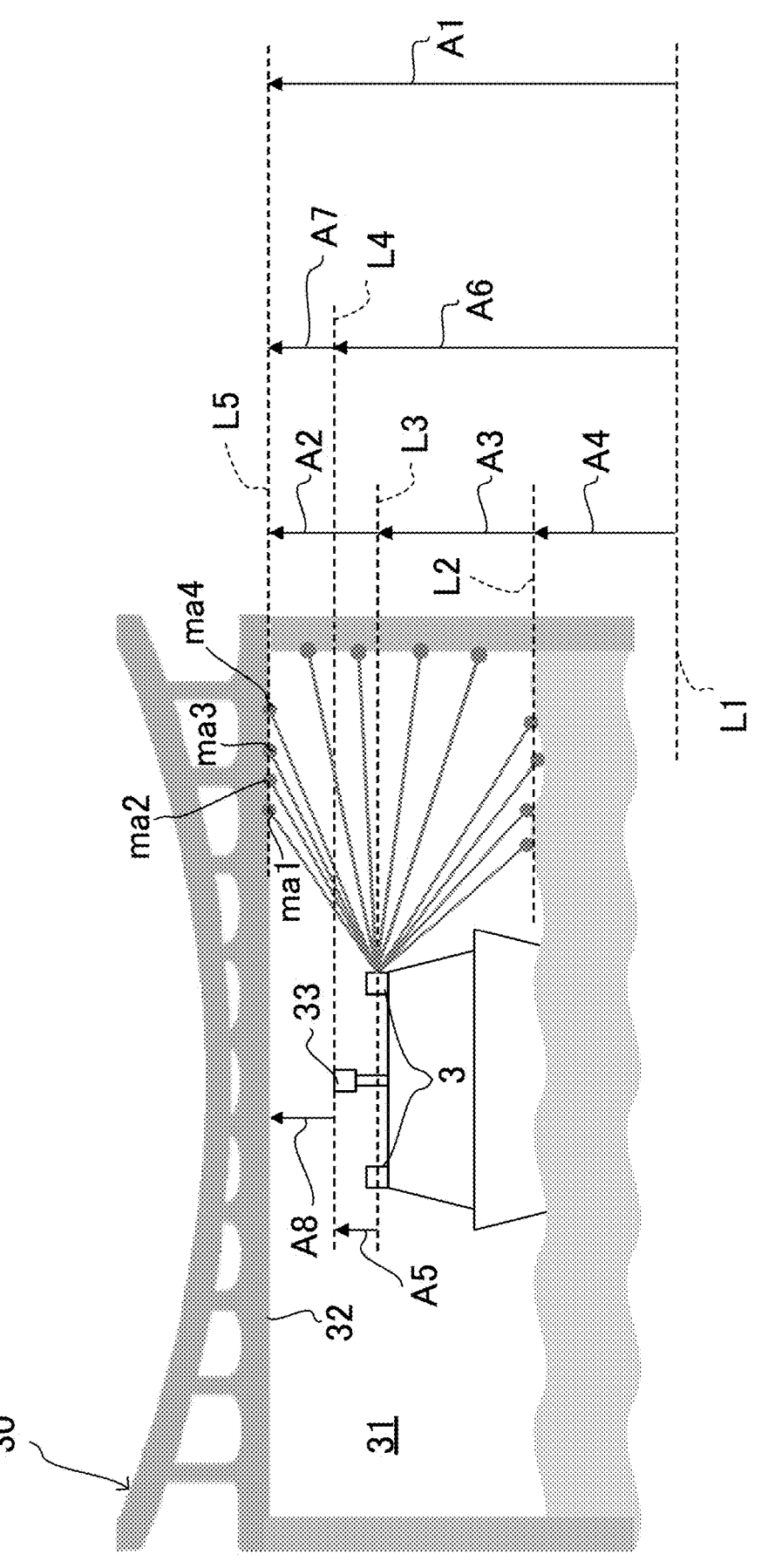
FIG. 7 It is a diagram of a rear view of a ship passing through such a bridge the predicted clearance between the ship and the bridge is already calculated.

FIG. 7 is a rear view of the ship passing through the bridge 30 for which the predicted clearance has already been calculated.

First, when passing through the bridge 30 whose predicted clearance is already calculated, the bridge passing feasibility determination unit 16 calculates the under-bridge distance (see the arrow A2) based on the bridge measurement data (data corresponding to the measured points "ma1" to "ma4" in FIG. 10) which is the point cloud data representing the measurement results generated by the lidar 3 upper than the horizontal direction. In some embodiments, in order to exclude any detected points of bridge piers, the bridge passing feasibility determination unit 16 may calculate the maximum value of the z-coordinate values of the point cloud data and then extract measured points whose z-coordinate values are close to the calculated maximum value to obtain the bridge measurement data. It is noted that the bridge measurement data used by the bridge passing feasibility determination unit 16 at this time is generated after the generation of the bridge measurement data used in the calculation of the predicted clearance.

Next, the bridge passing feasibility determination unit 16 calculates the measured clearance (see the arrow A8) by subtracting the height (according to the highest point information IH, see the arrow A5) of the highest point from the ship reference position from the calculated under-bridge distance (see the arrow A2).

Figure 8:
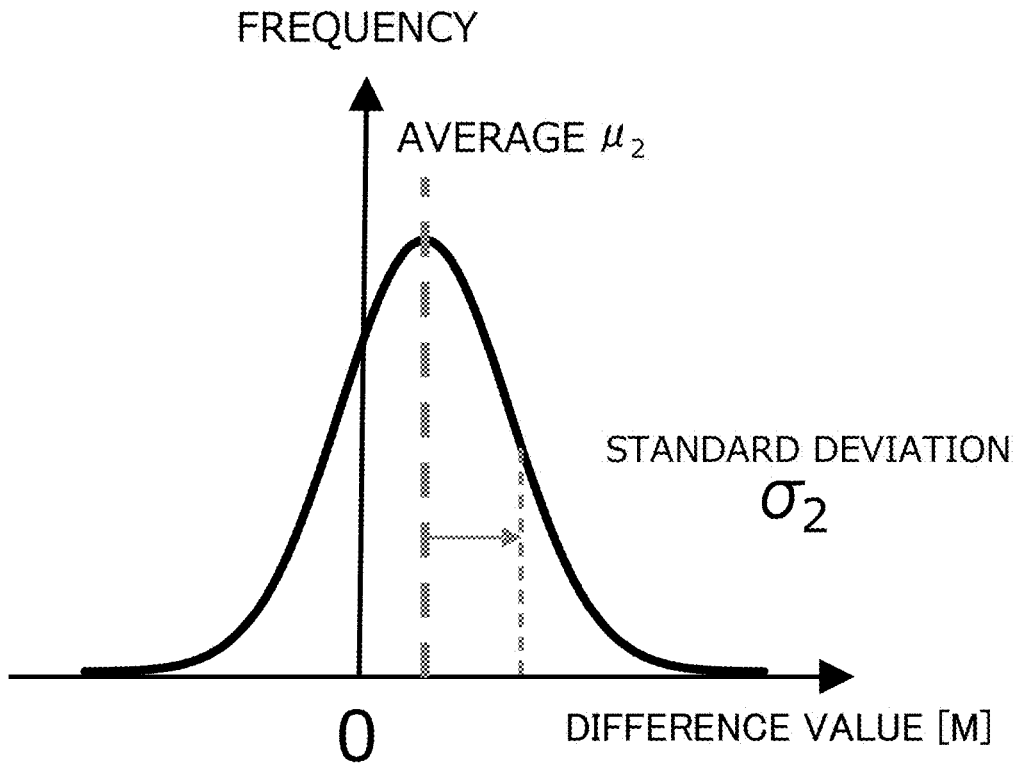
FIG. 8 It indicates the frequency distribution of the difference value between the predicted clearance and the measured clearance.

Then, the bridge passing feasibility determination unit 16 calculates the difference value between the predicted clearance and the measured clearance by subtracting the measured clearance from the predicted clearance of the bridge 30. The bridge passage feasibility determination unit 16 calculates the above-mentioned difference values for respective bridges under which the ship has passed during a predetermined period, and calculates the average "$\mu_2$" and the standard deviation "$\sigma_2$" of the calculated difference values. FIG. 8 shows the frequency distribution of the difference values in the case where the above-described difference values are regarded as discrete values.

Next, the bridge passage feasibility determination unit 16 corrects each predicted clearance by subtracting the average $\mu_2$ from each predicted clearance for all bridges under which the ship is supposed to pass subsequently, wherein the average $\mu_2$ is used as a constant offset (i.e., to be used universally for all bridges) to the predicted clearance. Thereby, it is possible to increase the accuracy of the predicted clearance of the bridges which the ship is going to pass and the accuracy of the bridge passing feasibility determination process. The offset described above is an example of the "correction information". The target bridges of the calculation of the average $\mu_2$ and the standard deviation $\sigma_2$ are an example of the "first bridge", and the target bridges (i.e., bridges which the ship is supposed to pass under) of correction of the predicted clearance is an example of the "second bridge".

Furthermore, the bridge passing feasibility determination unit 16 sets the coefficient k of the equation (1) so that the larger the standard deviation $\sigma_2$ is, the larger the predicted clearance threshold value Th becomes. For example, the bridge passing feasibility determination unit 16 sets the coefficient k as "3+$\sigma_2$" and determines the predicted clearance threshold value Th based on the following equation (2).

$$Th = (3 + \sigma_2) \cdot \sigma_1 \text{ (max)} \qquad (2)$$

As described above, according to this modification, the bridge passing feasibility determination unit 16 can adaptively set the predicted clearance threshold value Th such that the predicted clearance threshold value Th increases with an increase in the deviation of the predicted clearance from the measured clearance and the predicted clearance threshold value Th decreases with a decrease in the deviation, while increasing the prediction accuracy of the predicted clearance.

Second Modification

The bridge passing feasibility determination unit 16 may calculate the ship highest point height based on the measurement result of any feature by the lidar 3 and the feature data of the feature in the river map DB 10, wherein the feature is other than bridges and the feature data thereof is registered in the river map DB 10.

Figure 9:
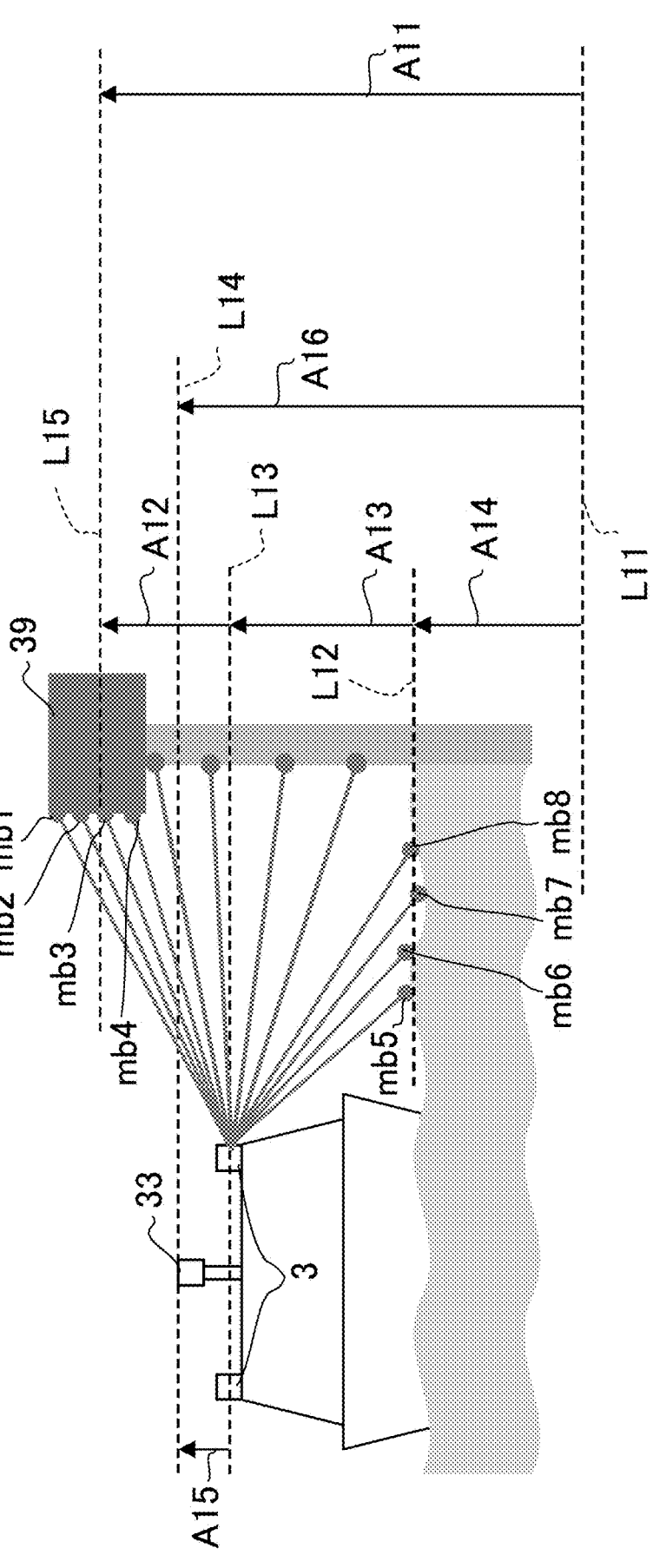
FIG. 9 It is a diagram showing an outline of the bridge passing feasibility determination process according to a modification.

FIG. 9 is a diagram showing an outline of the bridge passing feasibility determination process according to the second modification. FIG. 9 is a rear view of a ship passing by the side of the feature 39 (e.g., signboard) whose feature data is registered in the river map DB 10. The line "L11" indicates the origin of the height (bridge height and ship highest point height), the line "L12" indicates the water surface position, and the line "L13" indicates the position where the height is the same as the ship reference position. Further, the line "L14" indicates the position at the same height as the highest point of the ship, and the line "L15" indicates the position at the same height as the feature 39 (here, the height of the center position of the feature 39). Furthermore, the measured points "mb1" to "mb4" indicate the surface positions of the feature 39 measured by the lidar 3, the measured points "mb5" to "mb8" indicate the water surface positions measured by the lidar 3. Furthermore, there are measured points corresponding to the surface positions of the support of the feature 39. Then, as described below, the bridge passing feasibility determination unit 16 identifies the height or width corresponding to the arrows "A11" to "A16" in the order of the arrow A11 to the arrow A16 to calculate the predicted clearance to be used for the bridge passing feasibility determination.

FIG. 10 is an example of a flowchart illustrating a procedure of the bridge passing feasibility determination process according to the second modification. The processes at step S23, step S25, step S26, and step S27 in FIG. 10 are identical to the processes at step S13, step S15, step S16, and step S17 of FIG. 6, respectively. Hereinafter, the bridge passing feasibility determination process executed by the bridge passing feasibility determination unit 16 in the second modification will be described with reference to FIGS. 9 and 10.

The bridge passing feasibility determination unit 16 extracts the feature data corresponding to the feature 39 present in the measurement range of the lidar 3 from the river map DB 10, and then acquires the height (also referred to as "feature height") of the feature 39 based on the extracted feature data (step S21). The feature height of the feature 39 is a height corresponding to the arrow A11 in FIG.

9, and herein, as an example, the height of the center position of the feature 39 is registered in the feature data of the feature 39.

Next, the bridge passing feasibility determination unit 16 calculates the height-wise distance (also referred to as "feature distance") between the ship reference position and the feature 39 based on the point cloud data (also referred to as "feature measurement data") obtained by measuring, by the lidar 3, the feature 39 present within the measurement range of the lidar 3 (step S22). The feature distance of the feature 39 is a distance corresponding to the arrow A12 in FIG. 9. The bridge passing feasibility determination unit 16 may perform the process of extracting the feature measurement data (data corresponding to the measured points mb1 to mb4) of the feature 39 from the point cloud data outputted from the lidar 3 by any method. For example, if information on the reflectance of the feature 39 is included in the feature data of the feature 39, the bridge passing feasibility determination unit 16 extracts, based on the information regarding the reflectance, data indicating the received light intensity equivalent to the reflectance of the feature 39 from the point cloud data of the lidar 3 to thereby acquire the feature measurement data. If the size information is included therein, the bridge passing feasibility determination unit 16 extracts and acquires the feature measurement data that matches the size from the point cloud data.

Further, the bridge passing feasibility determination unit 16 calculates the water surface distance (see the arrow A13), based on the water surface measurement data (data corresponding to the measured points mb5 to mb8) that is point cloud data obtained by measuring the downward range by the lidar 3 (step S23).

Next, the bridge passing feasibility determination unit 16 calculates the water surface height (see arrow A14), on the basis of the feature height acquired at step S21, the feature distance calculated at step S22 and the water surface distance calculated at step S23 (step S24). Then, the bridge passing feasibility determination unit 16 calculates the ship highest point height (see the arrow A16) based on: the water surface height calculated at step S24 (see the arrow A14); the water surface distance calculated at step S23 (see the arrow A13); and the height-wise width (see the arrow A15) between the reference position of the ship and the highest point according to the highest point information IH (step S25).

Thereafter, the bridge passing feasibility determination unit 16 calculates the predicted clearance based on the bridge height of the target bridge of the bridge passing feasibility determination process and the ship highest point height (see the arrow A16) calculated at step S25 (step S26). In this instance, the bridge passing feasibility determination unit 16 extracts the feature data corresponding to the target bridge of the bridge passing feasibility determination process from the river map DB 10, and acquires the bridge height of the target bridge based on the extracted feature data.

Then, the bridge passing feasibility determination unit 16 determines the feasibility of the passage of the target bridge by the ship based on the predicted clearance calculated at step S26 (step S27). In this instance, in some embodiments, the bridge passing feasibility determination unit 16 sets, as described above, the predicted clearance threshold value Th which is a threshold value to be compared with the predicted clearance, on the basis of the standard deviation al which is an index representing the variation in the water surface distance calculated at step S23.

As described above, in the present modification, the bridge passing feasibility determination unit 16 can accurately perform the bridge passing feasibility determination process on the basis of the measurement results of any feature registered in the river map DB 10 and each feature data of the feature and the target bridge under which the ship is supposed to pass.

As described above, the controller 13 of the information processing device 1 according to the present embodiment is configured to acquire measurement data of a feature (e.g., bridge 30 or feature 39) measured by a lidar 3 provided on a ship and measurement data of a water surface. In addition, the controllers 13 is configured to acquire information regarding a height of the feature from a river map DB 10. Then, the controller 13 is configured to acquire highest point information IH regarding a height of the highest point of the ship from a reference position of the ship. Then, the controller 13 is configured to calculate a ship highest point height based on the measurement data of the feature, the measurement data of the water surface, the information regarding the height of the feature, and the highest point information IH. Thus, the controllers 13 can accurately calculate the ship highest point height required for determining the feasibility of passing the bridge by the ship without requiring accurate self position estimation such as NDT scan matching.

In the embodiments described above, the program is stored by any type of a non-transitory computer-readable medium (non-transitory computer readable medium) and can be supplied to a control unit or the like that is a computer. The non-transitory computer-readable medium include any type of a tangible storage medium. Examples of the non-transitory computer readable medium include a magnetic storage medium (e.g., a flexible disk, a magnetic tape, a hard disk drive), a magnetic-optical storage medium (e.g., a magnetic optical disk), CD-ROM (Read Only Memory), CD-R, CD-R/W, a solid-state memory (e.g., a mask ROM, a PROM (Programmable ROM), an EPROM (Erasable PROM), a flash ROM, a RAM (Random Access Memory)).

While the present invention has been described with reference to the embodiments, the present invention is not limited to the above embodiments. Various modifications that can be understood by a person skilled in the art can be made to the configuration and details of the present invention within the scope of the present invention. Namely, the present invention includes, of course, various modifications that may be made by a person skilled in the art according to the entire disclosure including claims and technical ideas. In addition, all Patent and Non-Patent Literatures mentioned in this specification are incorporated by reference in its entirety.

DESCRIPTION OF REFERENCE NUMERALS

1 Information processing device
2 Sensor group
3 Lidar
5 GPS receiver
10 River map DB

What is claimed is:
1. An information processing device comprising:
a processor coupled to a memory storing instructions for the processor to execute:
a first acquisition unit configured to acquire:

feature measurement data which is measurement data
of a feature measured by a measurement device
provided in a ship; and
water surface measurement data which is measurement
data of a water surface measured by the measure-
ment device;
a second acquisition unit configured to acquire informa-
tion regarding a height of the feature from map data;
and
a ship highest point height calculation unit configured to
calculate a ship highest point height which is a height
of a highest point of the ship in a coordinate system
adopted in the map data, based on;
the feature measurement data,
the water measurement data,
information regarding the height of the feature, and
highest point information regarding the height of the
highest point of the ship from a reference position of
the ship,
wherein the processor is configured to perform driving
control of the ship based on the ship highest point
height.
2. The information processing device according to claim
1, wherein the processor further executes:
a feature distance calculation unit configured to calculate
a feature distance, which is a distance in a height
direction between the reference position and the fea-
ture, based on the feature measurement data;
a water surface distance calculation unit configured to
calculate a water surface distance, which is a distance
in the height direction between the reference position
and the water surface, based on the water surface
measurement data; and
a water surface height calculation unit configured to
calculate a water surface height, which is a height of the
water surface, based on the height of the feature from
the map data, the feature distance, and the water surface
distance, and
wherein the ship highest point height calculation unit is
configured to calculate the ship highest point height in
the coordinate system adopted in the map data, based
on the water surface height, the water distance, and the
height of the highest point of the ship from the refer-
ence position of the ship.
3. The information processing device according to claim
1, wherein the processor further executes:
a predicted clearance calculation unit configured to cal-
culate a predicted clearance, which is a predicted
clearance between a bridge and the ship, based on
a bridge height which is a height of the bridge based on
the map data and
the ship highest point height, and
a passing feasibility determination unit configured to
determine, based on the predicted clearance, a feasi-
bility of passage under the bridge by the ship.
4. The information processing device according to claim
3, wherein the processor further executes:
a threshold value determination unit configured to deter-
mine a threshold value to be compared with the pre-
dicted clearance in determining the feasibility of the
passage,
wherein the threshold value determination unit is config-
ured to determine the threshold value based on an index
representing variation in a water surface distance which
is a distance in a height direction between the reference
position and the water surface.

5. The information processing device according to claim
4,
wherein the index is a standard deviation, and
wherein the threshold value determination unit is config-
ured to determine the threshold value based on a
maximum value of plural standard deviations calcu-
lated during a predetermined period.
6. The information processing device according to claim
4, wherein the threshold value determination unit is config-
ured to:
calculate a measured clearance between the bridge and the
ship, based on measurement data obtained by measur-
ing the bridge by a measurement device when the ship
passes the bridge,
calculate difference values between the measured clear-
ance and the predicted clearance for plural bridges, and
determine the threshold value based on an index repre-
senting variation in the calculated difference values and
an index representing variation in the water surface
distance.
7. The information processing device according to claim
4,
wherein the threshold value determination unit is config-
ured to increase the threshold value with an increase in
the variation indicated by the index.
8. The information processing device according to claim
3, wherein the predicted clearance calculation unit is con-
figured to:
calculate a measured clearance between a first bridge and
the ship based on measurement data obtained by mea-
suring the first bridge by the measuring device when
the ship passes the first bridge, and
generate correction information for correcting the pre-
dicted clearance of a second bridge other than the first
bridge, based on the measured clearance and the pre-
dicted clearance of the first bridge.
9. The information processing device according claim 3,
wherein the feature is the bridge, and
wherein the passing feasibility determination unit is con-
figured to determine the feasibility of the passage,
based on the predicted clearance and the height of the
bridge acquired from the map data by the second
acquisition unit.
10. The information processing device according to claim
3,
wherein the feature is a feature other than the bridge, and
wherein the second acquisition unit is configured to
further acquire information regarding a height of the
feature from the map data, and
wherein the passing feasibility determination unit is con-
figured to determine the feasibility of the passage based
on the predicted clearance and the height of the feature
acquired from the map data by the second acquisition
unit.
11. A control method executed by a computer, the control
method comprising:
acquiring:
feature measurement data which is measurement data
of a feature measured by a measurement device
provided in a ship and
water surface measurement data which is measurement
data of a water surface measured by the measure-
ment device;
acquiring information regarding a height of the feature
from map data;

calculating a ship highest point height which is a height of a highest point of the ship in a coordinate system adopted in the map data, based on;

the feature measurement data, the water measurement data, information regarding the height of the feature, and highest point information regarding the height of the highest point of the ship from a reference position of the ship; and controlling to perform driving control of the ship based on the ship highest point height.

12. A non-transitory computer readable medium storing a program causing a computer to:

acquire:

feature measurement data which is measurement data of a feature measured by a measurement device provided in a ship and water surface measurement data which is measurement data of a water surface measured by the measurement device;

acquire information regarding a height of the feature from map data;

calculate a ship highest point height which is a height of a highest point of the ship in a coordinate system adopted in the map data, based on;

the feature measurement data, the water measurement data, information regarding the height of the feature, and highest point information regarding the height of the highest point of the ship from a reference position of the ship; and control to perform driving control of the ship based on the ship highest point height.

* * * * *